United States Patent [19]
Brooke

[11] 4,291,973
[45] Sep. 29, 1981

[54] SCANNING SYSTEM

[75] Inventor: Edric R. Brooke, Bishops Stortford, England

[73] Assignee: Xerox Corporation, Stamford, Conn.

[21] Appl. No.: 105,369

[22] Filed: Dec. 19, 1979

[30] Foreign Application Priority Data

Dec. 21, 1978 [GB] United Kingdom ............... 49533/78

[51] Int. Cl.³ ............................................. G03B 27/72
[52] U.S. Cl. ......................................... 355/71; 355/8; 355/11; 355/51
[58] Field of Search ................... 355/8, 50, 51, 71, 11

[56] References Cited

U.S. PATENT DOCUMENTS 3,419,327 12/1968 Oikawa et al. .......................... 355/8

FOREIGN PATENT DOCUMENTS 127907 6/1959 U.S.S.R. ................................. 355/71

*Primary Examiner*—Richard A. Wintercorn

[57] ABSTRACT

An optical scanning system is provided wherein a document in an object plane is incrementally scanned by movement of a web provided with an elongated window therethrough. Light, reflected from the document in imagewise fashion, passes through the window and is reflected by a mirror moving a synchronism with said window through a projection lens onto an imaging plane.

7 Claims, 7 Drawing Figures

SCANNING SYSTEM

BACKGROUND OF THE INVENTION

The invention relates to scanning systems for document copying machines. The invention has particular application where an image of an original is projected onto a moving photosensitive surface.

A copying machine such as that described in British Patent Specification No. 995,413 uses an optical system comprising two fixed mirrors with a lens between the mirrors, the stationary original being illuminated by lamps on a movable lamp carriage, and light from the original being screened from the projection system except for a small slit between the lamps. British Patent Specification No. 1,122,622 describes a document copying machine in which the whole of the stationary original is illuminated during exposure, and scanning is achieved by oscillating one of the mirrors of the projection system about an axis in its plane. It has been proposed, for example in U.S. Pat. Specification No. 3,642,366 to have a more compact image projection system in which two mirrors are moved in different directions at speeds relating to the speed of movement of the photosensitive surface.

With a two mirror system an illuminator is mounted for traveling with one of the mirrors and this introduces additional mechanical inertia of the illuminator itself and its mountings. Further, the movements of scanning can be abrupt and subject to severe decelerations tending to reduce the life of the lamp.

It is an object of the present invention to provide an improved scanning system.

SUMMARY OF THE INVENTION

According to the invention there is provided a line-by-line scanning system for a document to be copied comprising a platen for supporting said document, stationary illumination means for illuminating said document, optical projection means for projecting light from the illuminated document onto a photosensitive surface, said optical projecting means including an opaque flexible web means having a diffuse reflective surface and being provided with a transparent transverse window therein, and web moving means being arranged to move said web along said platen so that said image of said document can pass in line-by-line fashion towards said photosensitive surface.

The invention will now be described by way of example with reference to the accompanying drawings.

DRAWINGS

DESCRIPTION

Figure 1:
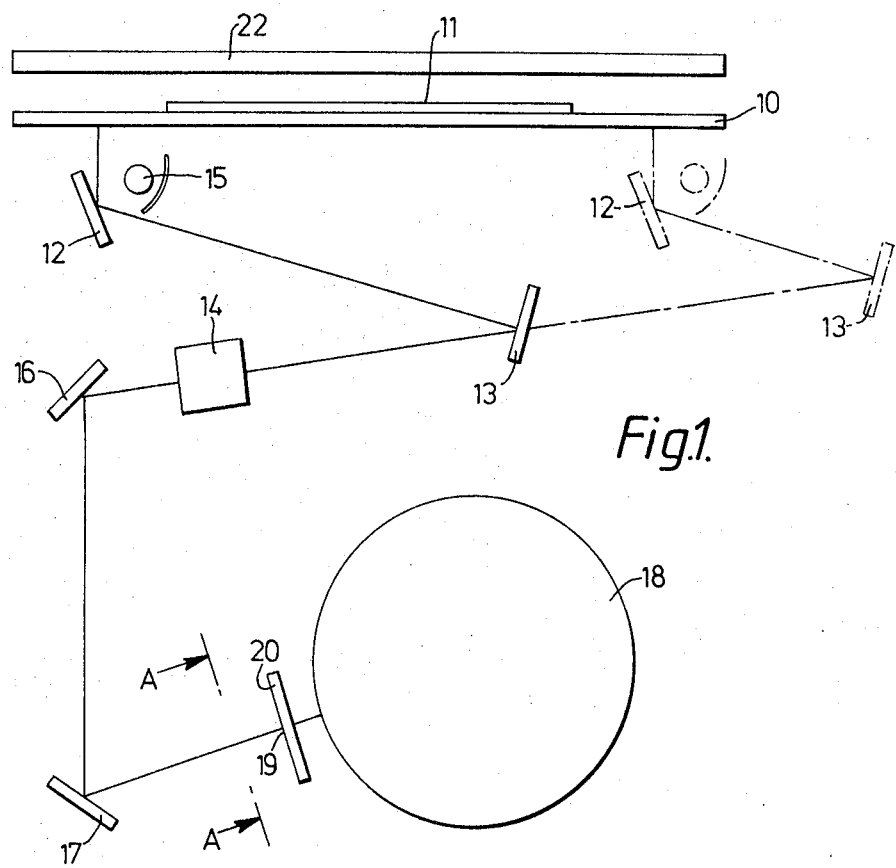
FIG. 1 shows a schematic view of a known optical scanning system in a copying machine.

Referring to the drawing, in FIG. 1 a platen 10 is provided to support a document 11. A scanning mirror system includes two movable mirrors 12 and 13 shown in their extreme left and right positions in full and dotted outline respectively. The mirror 13 is arranged to move at half the speed of the mirror 12 during scanning to maintain the optical distance constant between the document 11 and a lens 14. A tubular lamp 15 extending across the platen 10 parallel to the mirror 12 moves with the mirror 12. The lamp 15 is provided as illumination means to illuminate the document 11 through the platen 10 during scanning.

Figure 2:
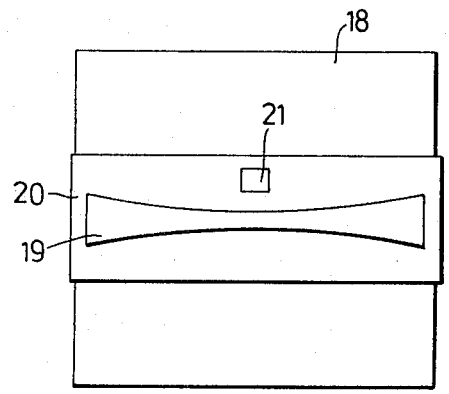
FIG. 2 shows a view A—A of FIG. 1.

The optical path extends from the platen 10 to the lens 14 and continues beyond the lens to mirrors 16 and 17 towards a photoreceptor drum 18. An optical slit 19, better seen in FIG. 2, is provided in a cover plate 20. The slit is used to restrict the image field and thus preserve image quality. A light intensity detector 21, shown in FIG. 2, is mounted on the plate adjacent the slit 19. A platen cover 22 comprising a plurality of juxtaposed angled mirrors is provided above the platen.

The configuration or shape of the slit 19 is narrower at its mid-point than at its extremities. This shape, as is already known in the art, is to compensate for the uneven distribution of illumination inherent in the lamp 15. Other shapes can be provided for lamps having different distribution characteristics.

In general operation, the document 11 is scanned by the sweep of the mirrors 12 and 13 from left to right forming a latent image of the document on the photoreceptor 18 which rotates in synchronism with the movement of the mirrors 12 and 13. The intensity of illumination incident on the document in the present example is determined by the magnitude of current supplied to the lamp 15. It is desirable to provide as far as possible constant irradiance at the image plane, that is, at the surface of the photoreceptor. Thus, to provide good copies of originals of widely differing reflectance properties arrangements are often made to alter the illumination of the originals according to their reflectance. In the embodiment, this is achieved by a pre-scan of the document 11 and by controlling the current to the lamp 15 in dependence upon the maximum intensity of light received at the detector 21 throughout the prescan.

Figure 3:
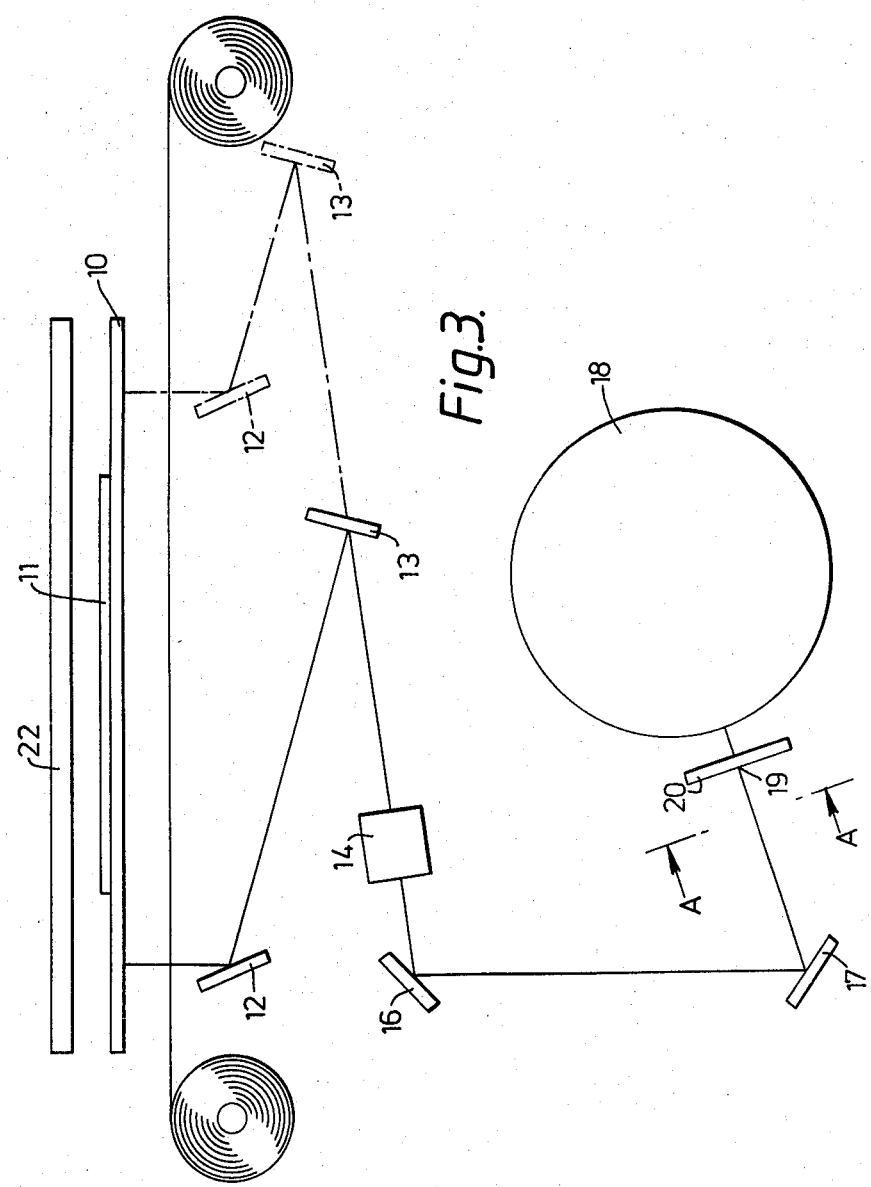
FIG. 3 shows the copier machine of FIG. 1 having a novel scanning system.
Figure 4:
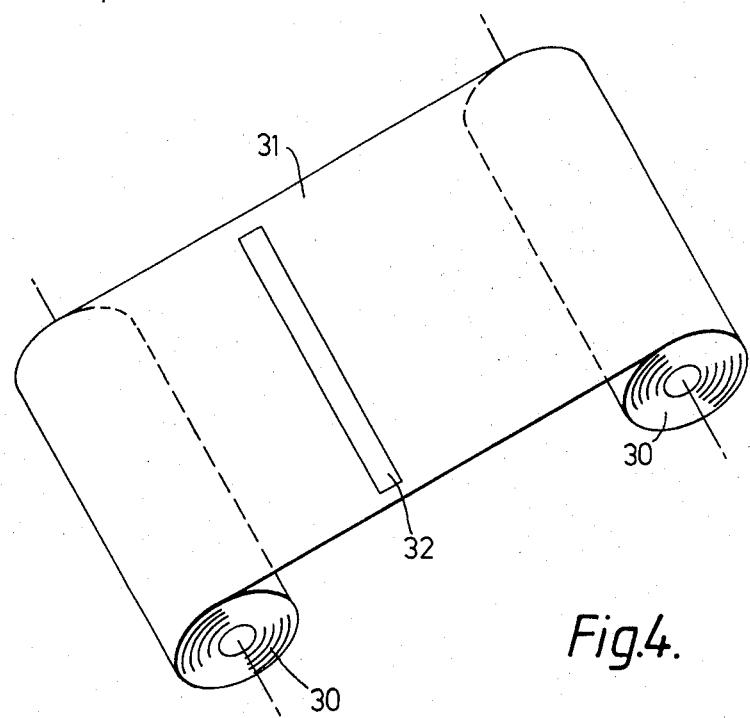
FIG. 4 shows view A—A of FIG. 3, illustrating a first embodiment of a scanning web arrangement.

In FIG. 3, the lamp 15 is removed and replaced by lamps (not shown) positioned at each side of the copier and under the platen 10. A pair of pulleys 30 are provided for supporting and moving a flexible web 31. The layout of the rollers 30 and the web 31 is better seen in FIG. 4 where an elongate window 32 is shown extending across the width of the web 31. Preferably, the upper surface of the web 31 is formed of or coated with highly diffuse reflective material.

The pulleys 30 are driven backwards and forwards (by means not shown) in synchronism with the scanning movement of the mirrors 12 and 13 so that a line-by-line image is projected through the slot 32 onto the mirror 12.

Figure 5:
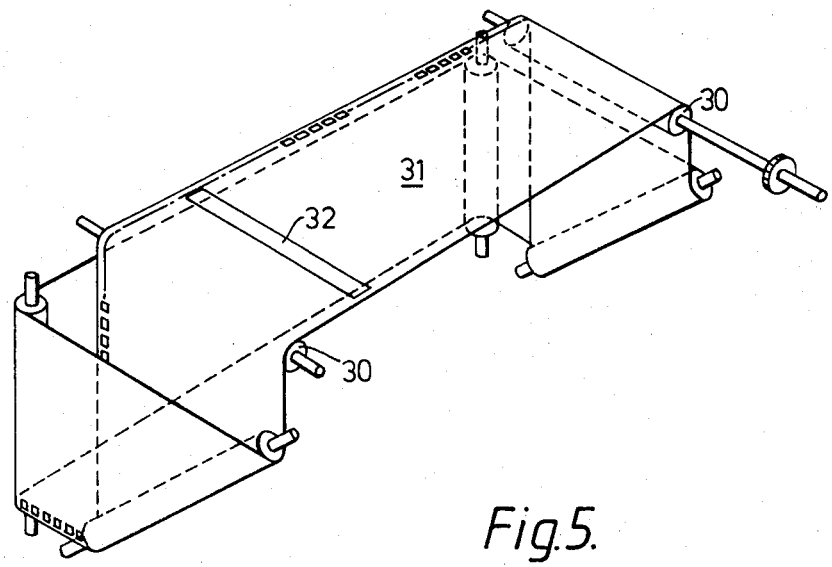
FIG. 5 shows a second embodiment of a scanning web arrangement.

In FIG. 5, a different web arrangement is provided. The web 31 is a continuous web having a window 32 as before. The web is constrained in a circuituous path by a number of pulleys or slides so as to travel along beneath platen 10 for scanning. A return path is provided at the side of the platen where the web is out of line-of-sight of the optical projection system. The advantage of the arrangement of FIG. 5 is that no fly-back is required and this reduces mechanical inertia even further.

In use, web 31 in FIG. 5 is driven continuously by engagement with sprocket holes in the web. During continuous movement of the web the window is arranged to pass along the under surface of the platen and synchronised with the movement of the mirror 12 during scanning as before. More than one window can be provided in the web so that it is not then necessary to wait for the first window to return to the start of scan position.

Figure 6:
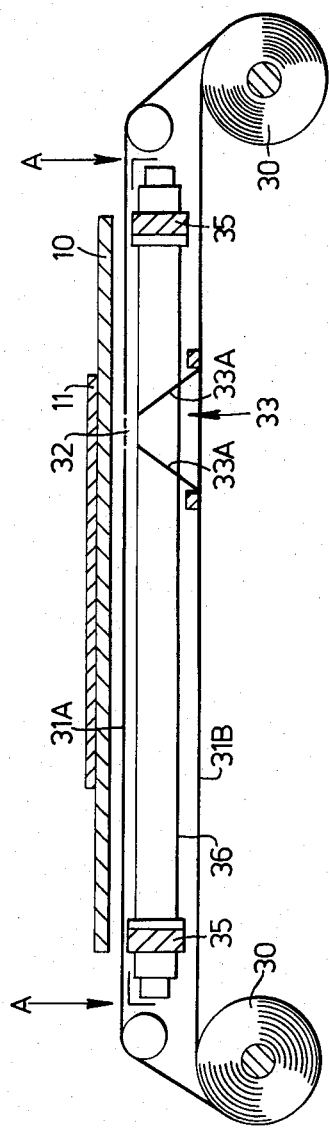
FIGS. 6 and 7 show a third web arrangement.
Figure 7:
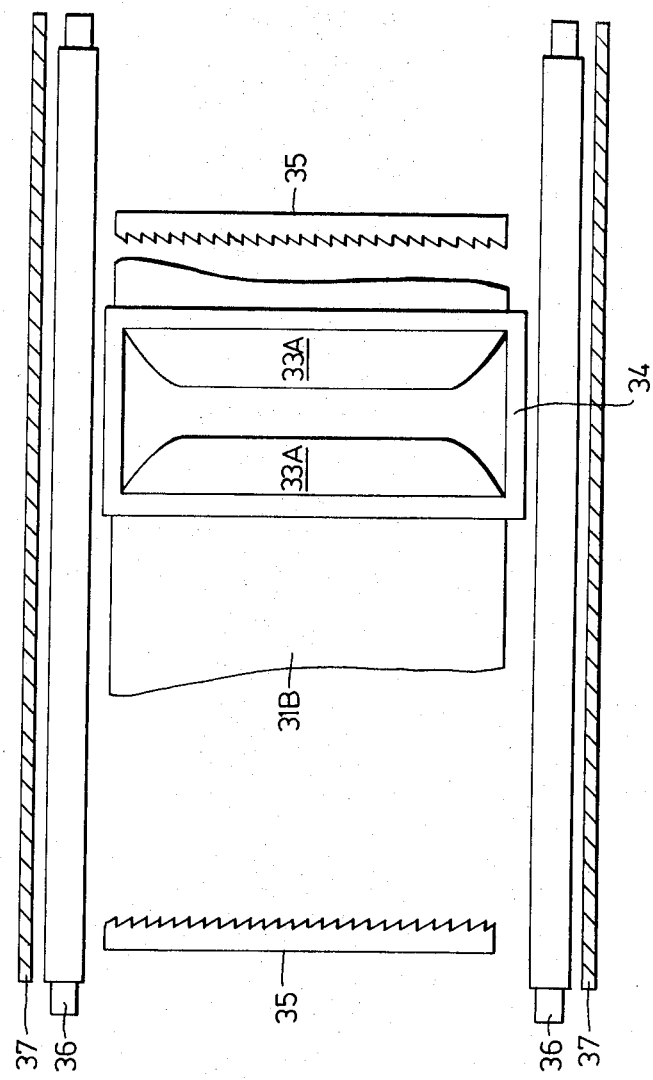

In FIGS. 6 and 7, there are provided two webs 31A and 31B. The upper web has a window 32. The lower web 31B is provided with a window 33 having raised lips 33A supported by a frame 34. Under each end of the platen 10 and between the webs 31A and 31B are mounted Fresnel mirrors 35. Under each side lamp is shown machine sides 37. Concave reflectors may be preferably provided mounted on the sides 37 to focus light into the region between the webs 31a and 31b.

The upper surface of the lips 33A are made of or coated with highly diffuse reflective material (such as Kodak white paint No. 6080). Likewise, the inward facing surfaces of the webs 31A and 31B and the sides 37 are preferably coated with highly diffuse reflective material.

During scanning the webs 31A and 31B are driven by the pulleys 30 such that the windows 32 and 33 move together in synchronism with the mirror 12.

It will be appreciated that embodiments of the invention provide scanning systems which are generally simpler and have very much lower mechanical inertia than earlier proposals where at least one mirror had to be moved for scanning. The fact the lamp does not have to move provides an additional advantage tending to extend the life of the lamp.

What is claimed is:

1. An optical scanning system for a copier comprising at least one stationary illumination source for illuminating a document lying in an object plane,
   at least one scanning mirror adapted for movement in a plane parallel to said object plane,
   at least one flexible belt adapted for movement in a plane parallel to and located between said object plane and said scanning mirror plane, said flexible belt having at least one elongated window extending across its width, the movement of said mirror and said web being synchronized so that light incrementally reflected from said document is transmitted through said window to said mirror thereby effecting line by line scanning of said document, and
   projection means for projecting images reflected by said scanning mirror onto a moving imaging plane.

2. The optical scanning system of claim 1 wherein said belt and scanning mirror are adapted for synchronous reciprocal motion.

3. The optical scanning system of claim 1 wherein said flexible belt has an endless configuration.

4. The optical scanning system of claim 1 wherein two illumination sources are provided, one on each side of the document scan area to provide a relatively uniform illumination of the document.

5. The optical scanning system of claim 1 wherein two of said flexible belts are provided, the belts aligned so that said elongated windows are aligned, and wherein the belt furthest from the object plane is provided with raised reflective lips for reflecting light away from the window of said belt.

6. The optical scanning system of claim 5 further including two elongated fresnel mirrors positioned between said belts and at opposite ends of the scan area.

7. An optical scanning system according to claim 1 in which said flexible web has a diffuse reflective upper surface.

* * * * *